(12) United States Patent
Knowles et al.

(10) Patent No.: US 8,615,549 B2
(45) Date of Patent: *Dec. 24, 2013

(54) METHOD FOR TRAINING A SERVER FOR CONTENT DELIVERY BASED ON COMMUNICATION OF STATE INFORMATION FROM A MOBILE DEVICE BROWSER

(75) Inventors: Michael Knowles, Waterloo (CA); David Tapuska, Waterloo (CA); Tatiana Kalougina, Waterloo (CA)

(73) Assignee: Blackberry Limited, Waterloo, ON (CA)

( * ) Notice: Subject to any disclaimer, the term of this patent is extended or adjusted under 35 U.S.C. 154(b) by 112 days.

This patent is subject to a terminal disclaimer.

(21) Appl. No.: 13/173,187

(22) Filed: Jun. 30, 2011

(65) Prior Publication Data

US 2011/0264731 A1    Oct. 27, 2011

Related U.S. Application Data

(63) Continuation of application No. 11/490,496, filed on Jul. 21, 2006, now Pat. No. 8,005,891.

(30) Foreign Application Priority Data

Jul. 22, 2005    (CA) ..................................... 2513018

(51) Int. Cl.
    *G06F 15/16*    (2006.01)
(52) U.S. Cl.
    USPC ........... 709/203; 709/218; 709/219; 709/223; 709/225; 709/226
(58) Field of Classification Search
    USPC ....................................................... 709/203
    See application file for complete search history.

(56) References Cited

U.S. PATENT DOCUMENTS 6,055,569 A * 4/2000 O'Brien et al. ................ 709/223
6,154,767 A * 11/2000 Altschuler et al. ............ 709/203

(Continued)

FOREIGN PATENT DOCUMENTS

WO    WO 01/76279 A2    10/2001

OTHER PUBLICATIONS

Knowles et al., "Method for Training a Proxy Server for Content Delivery Based on Communication of State Information From a Mobile Device Browser", U.S. Appl. No. 11/490,496, filed Jul. 21, 2006.

(Continued)

*Primary Examiner* — Firmin Backer
*Assistant Examiner* — Natisha Cox
(74) *Attorney, Agent, or Firm* — Perry + Currier (57) ABSTRACT

A method for training a server for content delivery based on communication of state information from a mobile device browser, the method comprising providing a control channel between the server and mobile device browser, transmitting over the control channel a plurality of request messages from the mobile device browser to the server for Web pages, each of the messages indicating browsing-related state data, and implementing heuristic algorithms within the server to detect and learn patterns of the request messages, pre-fetching at least hypertext content of Web pages that the server has learned will likely be requested, and embedding the hypertext content in response codes within response messages over the control channel from the server to the mobile device browser.

18 Claims, 5 Drawing Sheets

(56) References Cited

U.S. PATENT DOCUMENTS

| | | | |
|---|---|---|---|
| 7,565,423 B1* | 7/2009 | Fredricksen | 709/223 |
| 7,747,749 B1* | 6/2010 | Erikson et al. | 709/226 |
| 2002/0042920 A1 | 4/2002 | Thomas et al. | |
| 2003/0088580 A1* | 5/2003 | Desai et al. | 707/104.1 |
| 2003/0126232 A1* | 7/2003 | Mogul et al. | 709/219 |
| 2004/0088375 A1* | 5/2004 | Sethi et al. | 709/218 |
| 2004/0210604 A1* | 10/2004 | Li et al. | 707/104.1 |
| 2005/0060498 A1 | 3/2005 | Curtis | |
| 2005/0138176 A1* | 6/2005 | Singh et al. | 709/226 |
| 2005/0144394 A1* | 6/2005 | Komarla et al. | 711/137 |
| 2006/0031635 A1* | 2/2006 | Zohar et al. | 711/113 |
| 2006/0077897 A1* | 4/2006 | Kotzin | 370/235 |
| 2006/0277271 A1* | 12/2006 | Morse et al. | 709/217 |
| 2008/0222242 A1* | 9/2008 | Weiss et al. | 709/203 |

OTHER PUBLICATIONS

Related Canadian Patent Application No. 2615715 Office Action dated Jun. 11, 2012.

* cited by examiner

METHOD FOR TRAINING A SERVER FOR CONTENT DELIVERY BASED ON COMMUNICATION OF STATE INFORMATION FROM A MOBILE DEVICE BROWSER

CROSS REFERENCE TO RELATED APPLICATIONS

The present application is a continuation of U.S. patent application Ser. No. 11/490,496, filed on Jul. 21, 2006 which in turn claims priority from Canadian Patent Application 2513018 filed on Jul. 22, 2005, both which are incorporated herein by reference

COPYRIGHT NOTICE

A portion of this specification contains material that is subject to copyright protection. The copyright owner has no objection to the facsimile reproduction by anyone of the patent document, as it appears in the Patent and Trademark Office patent file or records, but otherwise reserves all copyrights whatsoever.

FIELD

This specification relates generally to mobile data communication systems, and more particularly to a method of training a server for content delivery based on communication of state information from a mobile device browser.

BACKGROUND

Mobile communication devices are becoming increasingly popular for business and personal use due to a relatively recent increase in number of services and features that the devices and mobile infrastructures support. Handheld mobile communication devices, sometimes referred to as mobile stations, are essentially portable computers having wireless capability, and come in various forms. These include Personal Digital Assistants (PDAs), cellular phones and smart phones.

It is known in the art to provide Internet browser functionality in such mobile communication devices. In operation, a browser user-agent in the handheld mobile communication device issues commands to an enterprise or proxy server implementing a Mobile Data Service (MDS), which functions as an acceleration server for browsing the Internet and transmitting text and images to the mobile device for display. Such enterprise or proxy servers generally do not store the state of their clients (i.e. the browser user-agent), or if they do, the state that is stored is minimal and limited to HTTP state (i.e. cookies). Typically, such enterprise or proxy servers fetch and transmit data to the browser user-agent when the browser makes a data request. In order to improve the performance of the browser on the mobile device, some enterprise or proxy servers fetch all the data required in order to fulfill the data request from the browser, aggregate the fetched data, and transmit the data to the device browser. For instance, if a HyperText Markup Language (HTML) page is requested, the enterprise or proxy server fetches any additional files referenced within the HTML page (e.g. Images, inline CSS code, JavaScript, etc.). Since the proxy server fetches all the additional files within the HTML file, the device does not have to make additional data requests to retrieve these additional files. Although this methodology is faster than having the device make multiple requests, the proxy server nonetheless has to send all of the data again if the site is later revisited.

This is because the proxy server has no knowledge of the device caches (e.g. caches that are saved in persistent memory, for different types of data such as a content cache to store raw data that is cached as a result of normal browser activity, a channel cache containing data that is sent to the device by a channel or cache push, and a cookie cache containing cookies that are assigned to the browser by visited Web pages). For example, if a user browses to CNN.com, closes the browser to perform some other function (e.g. place a telephone call or access e-mail messages, etc.) and then later accesses the CNN.com Web site (or follows a link from CNN.com to a news story), the banner "CNN.com" will be transmitted from the MDS to the device browser each time the site is accessed, thereby consuming significant bandwidth, introducing delay, etc.

It is known in the art to provide local file caching. One approach is set forth in *GloMop: Global Mobile Computing By Proxy*, published Sep. 13, 1995, by the GloMop Group, wherein PC Card hard drives are used as portable file caches for storing, as an example, all of the users' email and Web caches. The user synchronizes the file caches and the proxy server keeps track of the contents. Mobile applications (clients) are able to check the file caches before asking for information from the proxy server by having the server verify that the local version of a given file is current.

BRIEF DESCRIPTION OF THE DRAWINGS

A detailed description of the preferred embodiment is set forth in detail below, with reference to the following drawings, in which.

DETAILED DESCRIPTION

In general, there is provided a method of training a server for content delivery based on communication of state information from a mobile device browser, the method comprising providing a control channel between the server and mobile device browser, transmitting over the control channel a plurality of request messages from the mobile device browser to the server for Web pages, wherein each of the messages indicates browsing-related state data, implementing a heuristic algorithm within the server to detect and learn patterns of request messages and pre-fetching at least hypertext content of Web pages that the server has learned will likely be requested, and embedding the hypertext content in response codes within response messages over the control channel from said server to the mobile device browser.

A specific application of this method provides for communicating information between an enterprise or proxy server and a mobile Internet browser. An HTTP-like protocol is set forth, referred to herein as the Browser Session Management (BSM) protocol, for providing a control channel between the proxy server and the mobile device browser, so that the mobile device browser can communicate to the proxy server what data the first mobile device browser has stored in memory (from previous browsing). The BSM protocol is an "out of band" protocol in that BSM communications are in addition to the usual stream of HTTP requests from the mobile device browser to the proxy server and provide "metadata" relating to cache contents. This metadata is used by the proxy server when handling subsequent requests from the mobile device browser, to determine what data to send to the mobile device browser, thereby significantly reducing data transfer on subsequent requests relative to the prior art methodology discussed above.

Because the proxy server is aware of what the mobile communication device has stored in its cache, the amount of data sent to the mobile communication device may be reduced, thereby increasing the performance of the mobile communication device and reducing operational cost. If after the first request the CNN.com banner is cached and provided the proxy server "knows" that the information has been cached, then there will be no need to send the CNN.com banner to the mobile device browser upon subsequent visits to the CNN Web site.

According to another aspect, messages from the device to the proxy server contain hash values of different portions of documents (rather than the actual URLs) which are used by the proxy server to detect state changes in the device and utilize the information in preparing documents for transmission to the device. In another embodiment, the device sends hashes of the actual data of the portions (i.e. the actual image data, JavaScripts, StyleSheets, etc.) and the proxy server compares the received and stored data hashes for the portions to determine if the device already has the data for a particular portion (e.g. previously retrieved with a different URL), in which case the proxy server sends a response to the device with a header that indicates the device already has the data that is to be used for that portion. A person of skill in the art will appreciate that a one-way hash function transforms data into a value of fixed length (hash value) that represents the original data. Ideally, the hash function is constructed so that two sets of data will rarely generate the same hash value. Examples of known hash functions include MD2, MD5 and SHA-1.

In contrast to the prior art GloMop caching methodology discussed above, the exemplary method set forth herein synchronizes the cache contents when the mobile device browser connects to the proxy server in order to initiate a session and keeps track of changes to the cache via knowledge of what data has been sent to the mobile device browser in combination with state information periodically received from the mobile device browser identifying what has actually been cached. Also, as set forth in greater detail below, the proxy server uses this cache knowledge to determine what to send back to the mobile device browser. In contrast, the prior art GloMop methodology does not contemplate sending any state information to the proxy server for identifying what has actually been cached in the device. Moreover, the prior art GloMop approach first checks the local cache, and then queries the proxy server to determine whether a particular data item in the cache is current or not. According to the GloMop prior art, the proxy server does not use its own knowledge of the mobile device browser cache to determine what to send back to the mobile device browser.

Another aspect of the specification provides a method comprising: providing, via a server, a control channel between the server and a mobile device; receiving, at the server, over the control channel requests from the mobile device for content, the requests comprising data identifying previously requested content cached at the mobile device; implementing, at the server, a heuristic algorithm to build an internal statistical model of patterns of the requests to determine subsequent content that the mobile device is most likely to request; pre-fetching, at the server, a portion of the subsequent content when the statistical model indicates that probability of requesting the subsequent content exceeds a first threshold, and otherwise awaiting another one of the requests comprising a content identifier and adjusting the statistical model in response thereto; and embedding at least the portion of the subsequent content in responses transmitted over the control channel from the server to the mobile device browser.

The method can further comprise modifying downloading of the content from the server to the mobile device based on tracking history of changes reflected in hash values of the data identifying the previously requested content cached at the mobile device.

The method can further comprise fetching a further portion of the subsequent content when the statistical model indicates that the probability of requesting the subsequent content exceeds a second threshold greater than the first threshold and otherwise awaiting the another one of the requests. The method can further comprise inlining subsequent content data after sending current content to the mobile device. The subsequent content data can be inlined within the current content. The statistical model can include time information for predicting that subsequent content will likely be requested within a specific time after the server begins sending current content to the mobile device.

The method can further comprise building different statistical models for each of a plurality of mobile devices serviced by the server.

The method can further comprise building a global statistical model for a plurality of mobile devices serviced by the server.

The statistical model can comprise a selective blend between a single statistical model built for the mobile device and a global statistical model built for a plurality of mobile devices serviced by the server, selected on a content-identifier-sequence-by-content-identifier-sequence basis.

The heuristic algorithm can be selected from a group consisting of Hidden Markov Model algorithms, Bayesian inference methods and Neural Networks.

Yet a further aspect of the specification provides a communication system comprising: a mobile device enabled to transmit over a control channel a plurality of requests, comprising data identifying previously requested content cached at the mobile device; and a server enabled to: implement a heuristic algorithm to build an internal statistical model of patterns of the requests to determine subsequent content that the mobile device is most likely to request; when the statistical model indicates that probability of requesting the subsequent content exceeds a first threshold pre-fetch a portion of the subsequent content, and otherwise: await another one of the requests comprising a content identifier; and adjust the statistical model in response thereto; and embed at least the portion of the subsequent content in responses transmitted over the control channel from the server to the mobile device browser.

The server can be further enabled to modify downloading of the content from the server to the mobile device based on tracking history of changes reflected in hash values of the data identifying the previously requested content cached at the mobile device.

The server can be further enabled to fetch a further portion of the subsequent content when the statistical model indicates that the probability of requesting the subsequent content exceeds a second threshold greater than the first threshold and otherwise awaiting the another one of the requests.

The server can be further enabled to inline subsequent content data after sending current content to the mobile device. The subsequent content data can be inlined within the current content. The statistical model can include time information for predicting that subsequent content will likely be requested within a specific time after the server begins sending current content to the mobile device.

The server can be further enabled to build different statistical models for each of a plurality of mobile devices serviced by the server.

The server can be further enabled to build a global statistical model for a plurality of mobile devices serviced by the server.

The statistical model can comprise a selective blend between a single statistical model built for the mobile device and a global statistical model built for a plurality of mobile devices serviced by the server, selected on a content-identifier-sequence-by-content-identifier-sequence basis.

The heuristic algorithm can be selected from a group consisting of Hidden Markov Model algorithms, Bayesian inference methods and Neural Networks.

Additional aspects and advantages will be apparent to a person of ordinary skill in the art, residing in the details of construction and operation as more fully hereinafter described and claimed, reference being had to the accompanying drawings.

Figure 1:
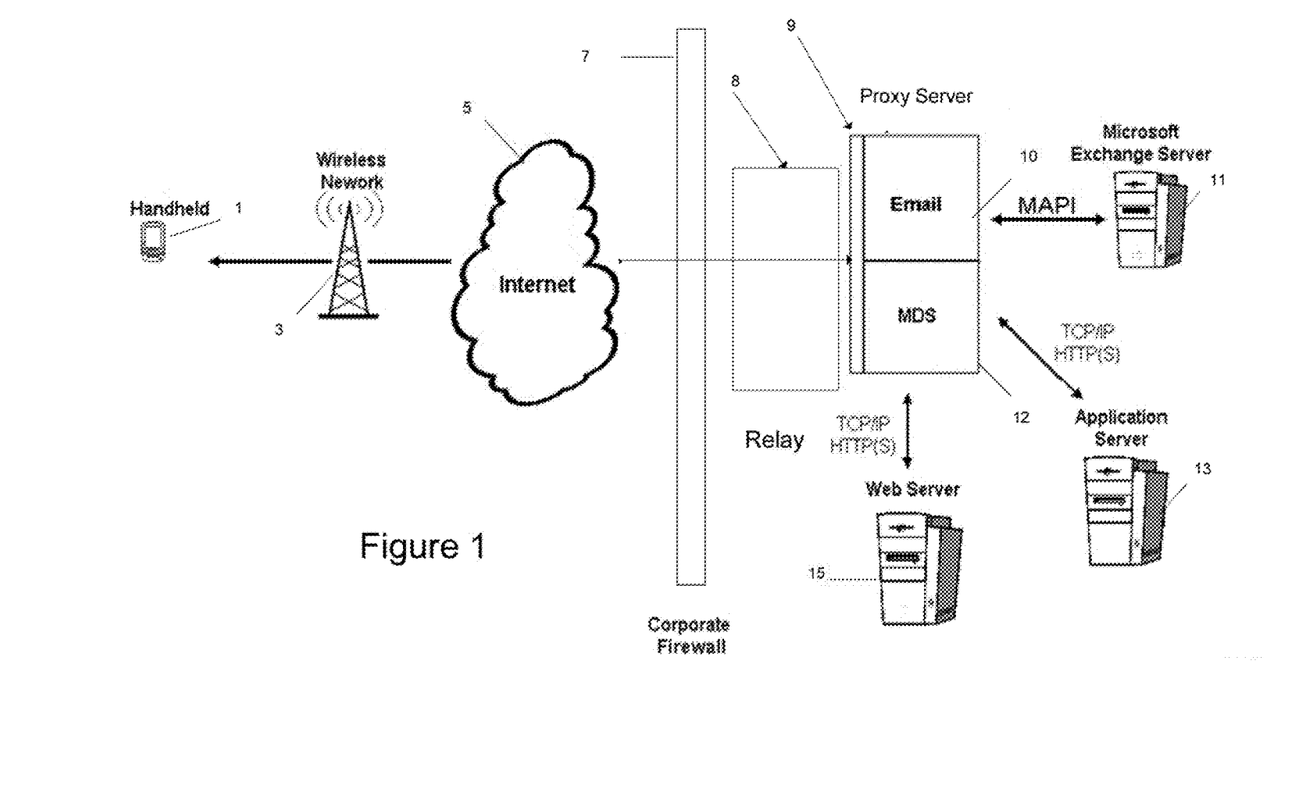
FIG. 1 is a block diagram of a communication system for implementing Internet browsing functionality in a mobile communication device.

FIG. 1 depicts the architecture of a system for providing wireless e-mail and data communication between a mobile device 1 and an enterprise or proxy server 9. Communication with the device 1 is effected over a wireless network 3, which in turn is connected to the Internet 5 and proxy server 9 through corporate firewall 7 and relay 8. Alternatively, the device 1 can connect directly (via the Internet) through the corporate firewall 7 to the proxy server 9. When a new message is received in a user's mailbox within email server 11, enterprise or proxy server 9 is notified of the new message and email application 10 (e.g. Messaging Application Programming Interface (MAPI), MS Exchange, etc.) copies the message out to the device 1 using a push-based operation. Alternatively, an exemplary architecture for proxy server 9 may provide a browsing proxy but no email application 10. Indeed, the exemplary embodiment set forth herein relates to mobile browser device functionality and is not related to email functionality. Proxy server 9 also provides access to data on an application server 13 and the Web server 15 via a Mobile Data Service (MDS) 12. Additional details regarding e-mail messaging, MAPI sessions, attachment service, etc., are omitted from this description as they are not germane. Nonetheless, such details would be known to persons of ordinary skill in the art.

In terms of Web browsing functionality, the device 1 communicates with enterprise or proxy server 9 using HTTP over an IP protocol optimized for mobile environments. In some embodiments, the device 1 communicates with the proxy server 9 using HTTP over TCP/IP, over a variant of TCP/IP optimized for mobile use (e.g. Wireless Profiled TCP), or over other, proprietary protocols. For example, according to the communications protocol of FIG. 2A, HTTP is run over Internet Point-to-Point Protocol (IPPP) and an encrypted Global Messaging Exchange (GME) channel over which datagrams are exchanged to transport data between the device 1 and proxy server 9. The GME datagrams are 64 Kbit in size whereas the wireless network 3 can only transport UDP (User Datagram Protocol) datagrams with payloads up to 1500 bytes. Therefore, a Message Delivery Protocol (MDP) is used to separate the GME datagrams into one or more MDP packets, each of which is less than 1500 bytes (default size 1300 bytes), which are transported over UDP/IP to and from the relay 8 which, in turn communicates with the proxy server 9 via Server Relay Protocol (SRP)/TCP/IP. The MDP protocol includes acknowledgements, timeouts and re-sends to ensure that all packets of the GME datagram are received.

Figure 2A:
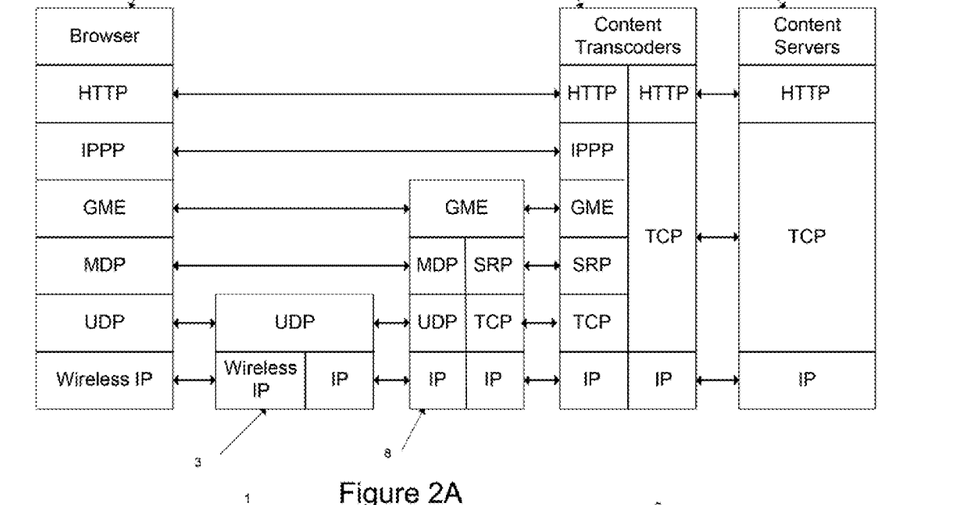
FIG. 2A shows communication protocol stacks for the communication system of FIG. 1.

The communication between the device 1 and proxy server 9 is optionally encrypted with an encryption scheme, such as Triple Data Encryption Algorithm (TDEA, formerly referred to as Triple Data Encryption Standard (Triple DES)), as is known in the art. The proxy server 9 enables Internet access, preprocesses and compresses HTML and XML content from the Web server 15 before sending it to the device 1, transcodes content type, stores HTTP cookies on behalf of the device 1, and supports certificate authority authentications, etc.

In response to a request from the device browser, the proxy server 9 retrieves content from Web server 15 and creates a custom document containing both images to be displayed on the device and data in the form of compressed versions of requested portions of the document. The document is preferably of "multi-part" format to improve transmission to and processing efficiency within the device 1. Specifically, in order to display composite Web pages (i.e. pages composed of a main WML or HTML page and one or more related auxiliary files, such as style sheets, JavaScript files, or image files) the device browser is normally required to send multiple HTTP requests to the proxy server 9. However, according to the multi-part generation feature, the proxy server 9 posts all necessary parts of a composite Web page in a single bundle, enabling the browser to download all the required content with a single request. The header in the server response identifies the content as a multi-part bundle (e.g. Multi-Purpose Mail Extensions (MIME)/multipart, as defined by RFC 2112, E. Levinson, March 1997).

Figure 2B:
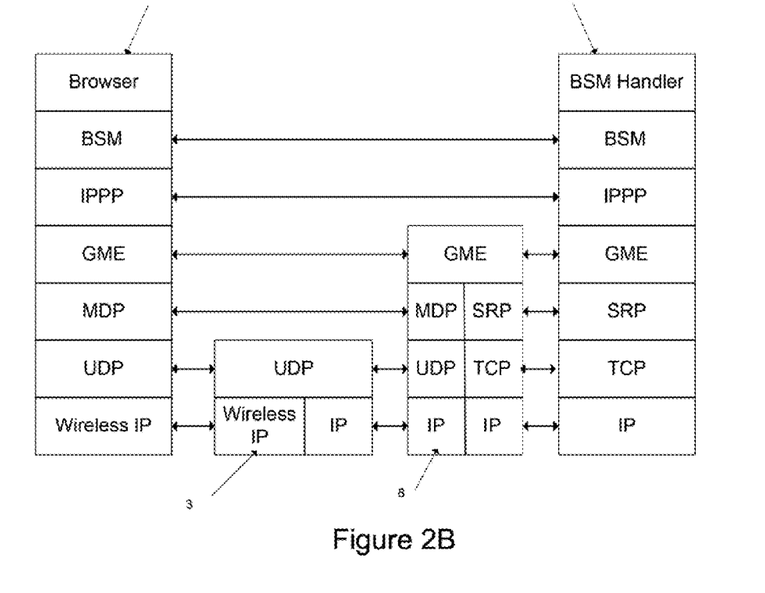
FIG. 2B shows communication protocol stacks for a Browser Session Management (BSM) protocol according to an exemplary embodiment.

In order to indicate device browser state information to the proxy server 9, three transitional state messages are defined herein, as follows: CONNECT, UPDATE and DISCONNECT, each of which conforms to the exemplary BSM protocol. As shown in FIG. 2B, the BSM communications protocol is identical to the protocol of FIG. 2A except that the conventional HTTP layer of the protocol stack is replaced by an HTTP-like BSM layer, including a Browser Session Management (BSM) Handler at the proxy server 9.

The CONNECT transitional message creates a new session with a connection identifier carried in the payload, device information and state data (e.g. current cache and device information) in the form of a set of hash functions for use by the proxy server 9 in preparing a response. Specific care is taken not to identify to the proxy server 9 what cookies or cache entries are contained on the device 1. Only hash values of the state data are sent to the proxy server 9 in order to protect the identity of state data on the device 1.

The CONNECT message also contains a unique authentication key for generating a MAC (Message Authentication Code) using a Hash Message Authentication Code (HMAC) algorithm that incorporates a cryptographic hash function in combination with the authentication key. Each portion of a multi-part document from the proxy server 9 also contains an HMAC, generated using the authentication key, that is used for authenticating the proxy server 9 before adding that portion to the device cache. This prevents a third party from creating its own multi-part document and sending it to the device 1 for injecting cache entries that could be used to extract personal information from the user.

Upon receipt of the CONNECT message, the proxy server 9 uses the state information to regulate or control the transmission of content retrieved from Web server 15 (step 23) to the device 1 depicted in FIG. 1 (step 23). One example of an application where this information can be used is when the proxy server 9 is pre-fetching images, inline Cascading Style Sheets (CSS), JavaScript, and the like for an HTML document. If the proxy server 9 already knows that the device 1 has the image, inline CSS, or JavaScript document, there is no need for resending the documents.

The UPDATE transition message notifies the proxy server 9 of changes that have occurred on the device 1 since the last CONNECT message or the last UPDATE message, between the device 1 and proxy server 9 (e.g. new cache entries added because of a push, or invoking the "Low Memory Manager" (LMM) or other memory-space preservation policies on the device and purging items from the cache).

The DISCONNECT transition message notifies the proxy server 9 that the device 1 will no longer send any more messages using the connection identifier specified in the payload. The proxy server 9 can then de-allocate any memory reserved for the connect session between the device 1 and proxy server 9. Upon receiving the disconnect message, the proxy server 9 deletes any session cookies for the device 1 (if it is processing cookies) along with state information. Receiving a request on the identified connection after the DISCONNECT has been received, and before any subsequent CONNECT message has been received, is defined as an error.

Since state is indicated from the device 1 to the proxy server 9, and state may be stored in transient memory within proxy server 9, a mechanism is provided for the proxy server 9 to return to the device 1 a message indicating that the session the device is trying to use is not valid. Once this occurs, the device 1 issues a new CONNECT message and establishes a new session with the proxy server 9, and re-issues the original request.

The data protocol set forth herein is similar to HTTP in order to reduce complexity and to reuse code that already exists for the HTTP protocol. Thus, data transmission according to this protocol begins with a STATE keyword; followed by a BSM (Browser Session Management) protocol identifier and a "Content-Length" header. The end of the "headers" is indicated by a double CRLF (a sequence of control characters consisting of a carriage return (CR) and a line feed (LF)), much like HTTP. After the double CRLF pair (i.e. \r\n) a WBXML (WAP Binary Extensible Markup Language) encoded document is inserted as the message payload. The WBXML document is later decoded using a DTD (Document Type Definition) and codebook, as discussed in greater detail below. The indication of the protocol version refers to what version of the DTD to validate the request against (ie. BSM/1.1 stipulates using version 1.1 of the DTD). It should be noted that WBXML encoding of the contents of BSM messages is set forth to allow for more efficient processing of the BSM message at the device 1, but that in alternate embodiments, the BSM message may be formatted as normal (textual) XML.

The following is an example communication using the protocol according to the preferred embodiment:

```
CONNECT BSM/1.0\r\n
Content-Length: 40\r\n
\r\n
<WBXML Encoded document of length 40 bytes>
BSM/1.0 200\r\n
r\n
```

In the foregoing, the first four lines form the CONNECT message from the device 1 to the proxy server 9, and the last two lines are the response from the proxy server 9.

An exemplary XML document, is as follows:

```
<?xml version="1.0"?>
<!DOCTYPE bsm PUBLIC "-// DTD BSM 1.0//EN"
    "http://www.something.com/go/mobile/BSM/bsm_1.0.xml">
<bsm id="2" hmac="12345678901234567890">
<cache>
<size>123012</size>
<entry urlHash="FEEDDEED01" dataHash="FDDEDEED11"
etag="SomeEtag" expiry="256712323"/>
</cache>
<device>
<version>4.0.1.123</version>
<memfree>12342342</memfree>
</device>
</bsm>
```

Figure 3:
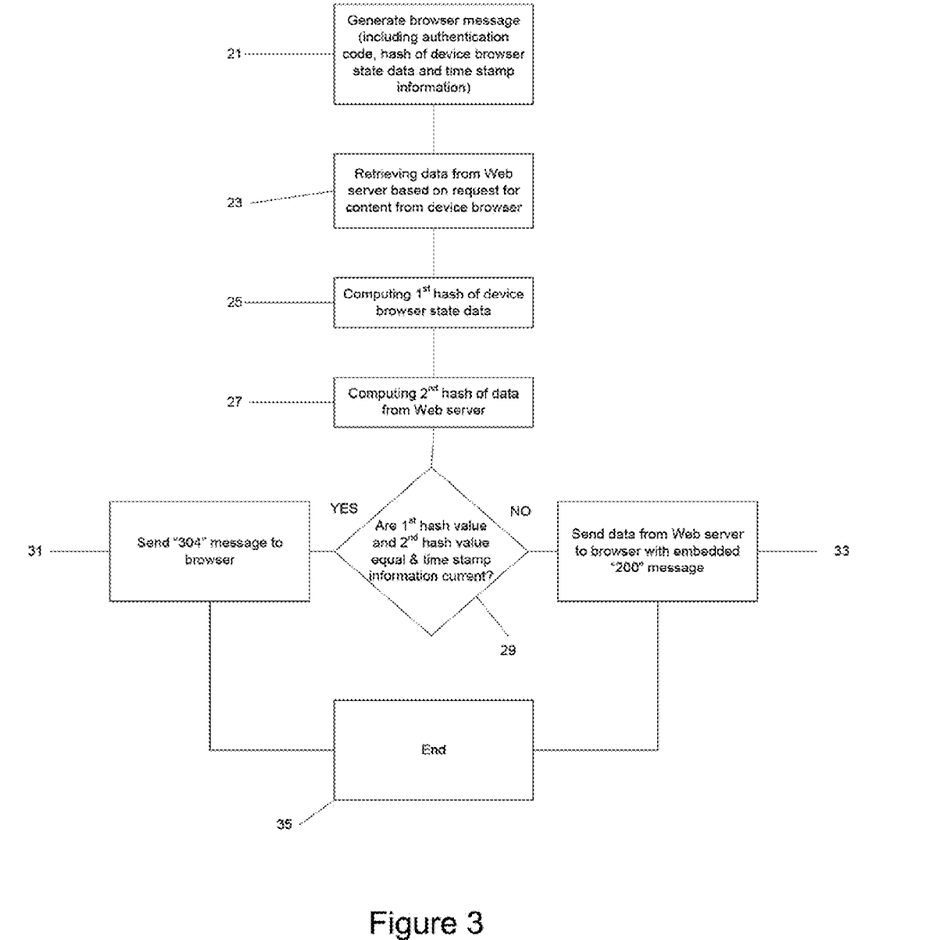
FIG. 3 is a flowchart showing the method for communicating information between a proxy server and a mobile Internet browser, according to the preferred embodiment.

In the example, the state data includes the URL of an HTML page within the device cache. It will be noted that the XML document payload includes a connection identifier (i.e. bsm id="2"), a value indicating when the document was last modified (i.e. etag="SomeEtag"), a page expiry (i.e. expiry="256712323"), and hash values for a URL (i.e. entry urlHash="FEEDDEED01") and a data attribute (i.e. entry dataHash="FDDEDEED11") rather than transmitting the actual URL and data attribute themselves. Thus, as shown in FIG. 3, the hashes of the URL and data attribute of the cached page are sent to the proxy server 9 in the CONNECT string (step 21). The proxy server 9 then fetches the requested page from Web server 13 (step 23), computes hashes of device browser state data (step 25) and data from the Web server 13 (step 27), and compares the hashes of the URL and data attribute of the requested page with the hashed URL and data attribute of the cached page, and also compares the time stamps/expiration information (step 29) in order to determine whether the cached page is current. Specifically, in response to the proxy server 9 retrieving a portion from the Web server 13, it computes the dataHash and urlHash of that portion and performs a comparison to the dataHashes and urlHashes of the entries it has saved. There are three cases.

In the first case, if both the dataHash and the urlHash of the retrieved portion match the dataHash and urlHash of a cache entry that the proxy server 9 knows the device 1 has, then the server 13 simply omits this portion from the response, as the device 1 still has a valid entry in its cache.

In the second case, if the dataHash of the retrieved portion matches the dataHash of a cache entry that the proxy server 9 knows the device 1 has, but the urlHash of the retrieved portion does not match the urlHash of that cache entry, the server 13 inlines this updated portion in the combined response to the device 1. However, because the dataHash matches a dataHash of an entry that already exists on the device 1, the inlined response does not include the actual data, but instead only includes a new HTTP header whose value is the new dataHash. When the device 1 receives this inlined portion, it detects the special header, looks for the cache entry with that dataHash, and either creates or updates its cache entry for that URL with the data corresponding to the dataHash by copying that data from the other cache entry (the cache for device 1 is modified to have two indexes, one to retrieve cache entries by URL, the other to retrieve cache entries by dataHash). Finally, if the proxy server 9 already has a cache entry for the urlHash, it updates that entry with the new dataHash; otherwise it creates a new entry for this portion.

In the third case, if the dataHash of the retrieved portion does not match the dataHash of any of the cache entries that the proxy server 9 has received from the device 1 in the BSM messages, then the server inlines the entire portion (headers and new data), since this portion has been updated and the device 1 does not contain the updated value anywhere in its cache.

Although not indicated in FIG. 3, it will be appreciated that each inline part to be added to a document to be displayed at the device 1 is fetched. If the response code from the proxy server indicates a "304" (step 31), then the part (i.e., the "304" response) is written as a block in the multipart document. On the other hand, if the proxy server 9 returns a "200" (step 33), then the hash compare operation is performed, and the portion is only included in the multipart document if the hash compare function indicates it is not already on the device 1. The method of FIG. 3 ends at step 35.

An exemplary DTD, according to the preferred embodiment, is as follows:

```
<!ELEMENT  bsm (cache?, device)>
<!ATTLIST  bsm
           id    NMTOKEN    #REQUIRED
>
<!ELEMENT  cache (size, (entry)+)>
<!ATTLIST  cache
           action  (add|remove|remove_all|quick_add)  "add"
>
<!ELEMENT  entry EMPTY>
<!ATTLIST  entry
           urlHash       CDATA     #REQUIRED
           dataHash      CDATA     #REQUIRED
           etag          CDATA     #IMPLIED
           expiry        NMTOKEN   #IMPLIED
           size          NMTOKEN   #IMPLIED
           last-modified NMTOKEN   #IMPLIED
>
<!ELEMENT  size (#PCDATA)>
<!ELEMENT  device (version, memfree)>
<!ELEMENT  version (#PCDATA)>
<!ELEMENT  memfree (#PCDATA)>
<!ELEMENT  hmac (#PCDATA)>
Element/Code
HMAC 12
Attribute/Code
size 9 (instead of action)
lastModified 10
actionAdd 11
actionRemove 12
actionRemoveAll 13
actionQuickAdd 14
```

Finally, an exemplary codebook, is as follows:

| Element | Code |
|---------|------|
| Session | 5 |
| Cache | 6 |
| Size | 7 |
| Entry | 8 |
| Device | 9 |
| Version | 10 |
| MemFree | 11 |
| HMAC | 12 |

| Attribute | Code |
|-----------|------|
| Id | 5 |
| UrlHash | 6 |
| dataHash | 7 |
| ETag | 8 |
| Expiry | 9 |
| Action | 10 |

As is well known in the art, the codebook is used as a transformation for compressing the XML document to WBXML, wherein each text token is represented by a single byte from the codebook.

As discussed above, the proxy server 9 transmits multi-part documents in a proprietary format of compressed HTML, interspersed with data for images and other auxiliary files (which may or may not be related to the main HTML Web page). However, in a departure from conventional HTML, each document part may also include a response code (e.g. "200" for OK, or "304" for "not modified" to indicate that the specified document part has already been cached in the device 1). This may be used for selective downloading of document parts rather than entire documents and for indicating when a part (e.g. image) is about to expire. This is useful, for example, when one Web page links to another page containing one or more common elements.

Of course, certain device requests (e.g. page refresh) will always result in a full document download, irrespective of device state information stored in the proxy server 9.

It is contemplated that the inclusion of response codes may be used by heuristic processes within the proxy server 9 to learn user behaviour and modify downloading of documents based on tracking the history of certain changes reflected in the hash value (e.g. the server 9 may learn to download a certain page (e.g. CNN news) at a particular time each day based the user's history of issuing requests for that page at regular times. As discussed above, because the downloaded documents are multi-part and contain embedded response codes, only those portions of the document that have changed are actually downloaded.

Figure 4:
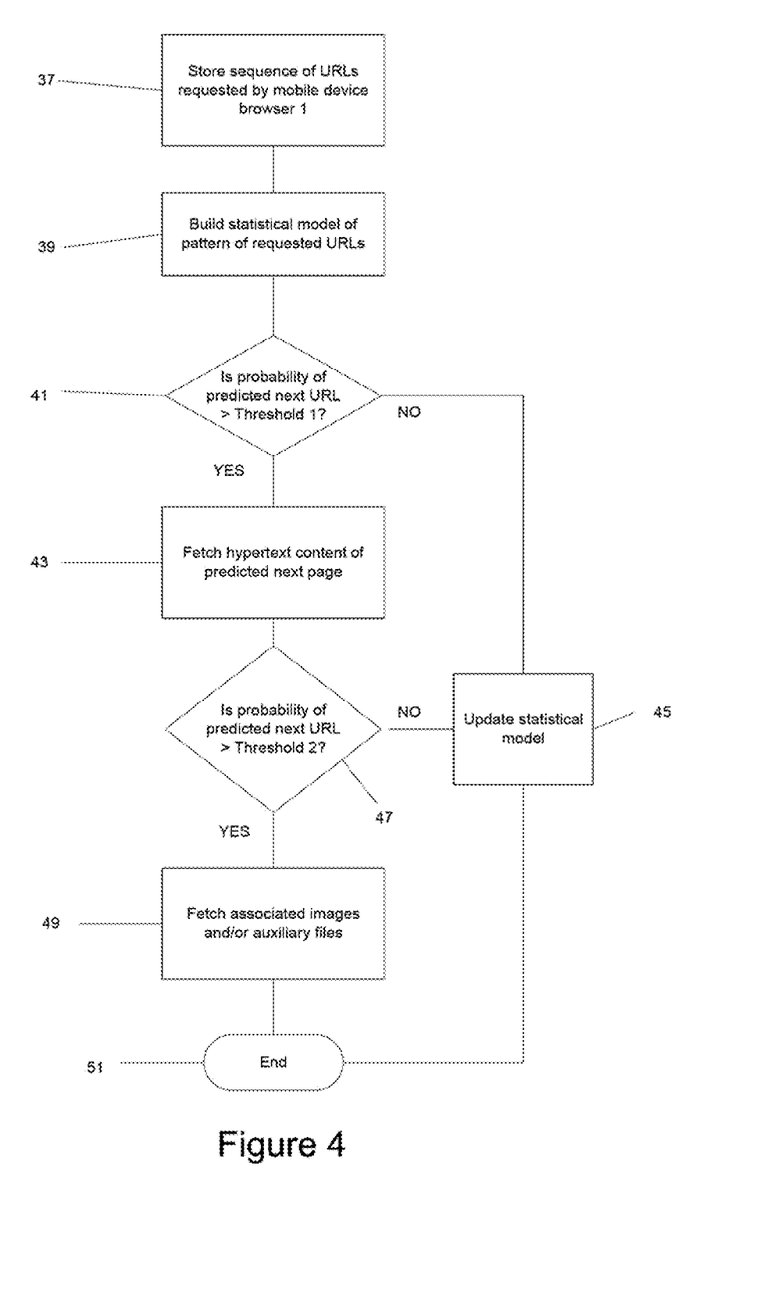
FIG. 4 is a flowchart showing the method of training the proxy server to deliver content based on detecting and learning patterns of request messages from the mobile device browser.

Turning to FIG. 4, a method is set forth in which the proxy server 9 uses heuristic algorithms to learn what additional data requests the device 1 may make based on knowledge of the current request, and knowledge of past activity. For example, in some instances, the device may consistently follow a pattern of requesting a first Web page (e.g. "cnn.com" Web page), followed by a second Web page (e.g. "cnn.com/news" Web page). According to the method depicted in FIG. 4, the proxy server 9 learns this pattern, such that whenever the device 1 requests the first Web page, the proxy server 9 determines that the device is likely to then request the second Web page and therefore automatically fetches the second Web page, uses its knowledge of the data cached on the device 1 (i.e. from the state information transferred to the proxy server 9 during initiation of the connection) to determine whether the second Web page already exists within the data cached on the device and whether the cached page is current (i.e. by comparing the time stamps/expiration information as discussed above with reference to step 29 of FIG. 3). If soothe second Web page exists and is current, the proxy server 9 includes information about the second Web page via response codes embedded within the response provided for the first Web page, as set forth in detail above. If the device 1 requires the second Web page, then the device 1 references its cache and thereby avoids having to make a request to the proxy server 9 for the second Web page.

Thus, at step 37 of FIG. 4, the proxy server 9 retains a history of the sequence of specific page requests made by the device browser. Preferably, the tracking history is based on changes reflected in the hash values of the browsing-related state data, as discussed above. The proxy server 9 then uses a heuristic technique to build an internal statistical model of the request patterns (step 39). Where the proxy server 9 services multiple devices 1, a separate statistical model is developed for each device 1. Alternatively, a global statistical model may be developed across all devices that the proxy server 9 is servicing. Or, indeed, the two foregoing statistical models may be blended to yield a best prediction on a URL-sequence-by-URL-sequence basis.

In any event, the statistical model developed at step 39 is used to determine the set of URLs that the device 1 is most likely to request next, given the particular historical sequence of previously requested URLs (step 37).

If, at step 41, the statistical model indicates that probability of a certain previously requested URL being requested next is above a certain threshold (Threshold 1), the proxy server 9 proactively fetches the HyperText content of the predicted next page (step 43). Otherwise, the method awaits the requested URL from the device 1 and adjusts the statistical model accordingly (step 45) and the method ends (step 51).

If, at step 47, the probability exceeds a higher threshold (Threshold 2) then all of the associated images and/or auxiliary files are fetched for the predicted next page (step 49).

According to one embodiment, the proxy server 9 inlines the "next page" data after it has sent the data for the current page to the device 1, in order to allow the device to fully render the current page. In another embodiment, the "next-page" data is inlined within the HTML of the current page rather than appended at the end of it. In both cases, the "next-page" data is still part of the response for the current page, rather than appearing in a separate request or response.

One example of the embodiment in which the "next-page" data is inlined is where the statistical model includes time information and determines that particular "next pages" will likely be requested very shortly after the proxy server 9 has started sending the current page data to the device 1. As discussed above, because the downloaded documents are multi-part and contain embedded response codes, only those portions of the document that have changed are actually downloaded.

Examples of heuristic techniques that may be used in step 39 include, but are not limited to, the Hidden Markov Model algorithms, Bayesian inference methods and Neural Networks.

The method set forth in FIG. 4 causes the proxy server 9 to constantly learn and refine the statistical model with every new page request it receives, to ensure that it most closely tracks the current behaviour of the devices it is servicing.

Figure 5:
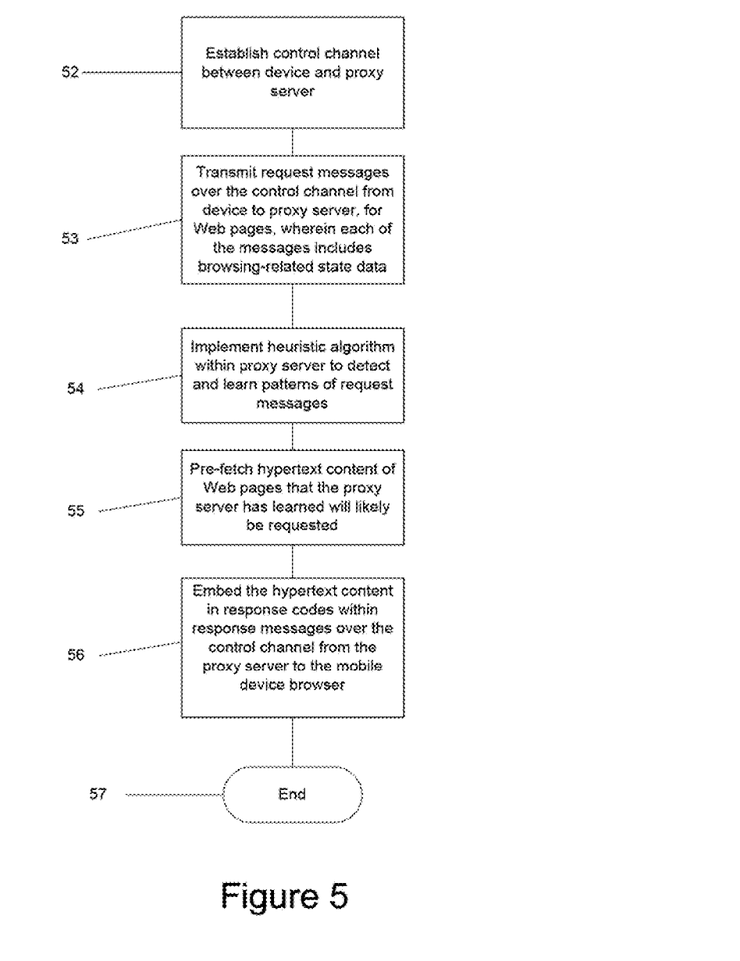
FIG. 5 is a flowchart of a broad aspect of the exemplary method of training a proxy server for content delivery based on communication of state information from a mobile device browser.

Turning now to FIG. 5, a broad aspect of the exemplary method of training a proxy server for content delivery based on communication of state information from a mobile device browser, is illustrated by way of a flowchart. At step 52, a control channel is established between the proxy server 9 and mobile device 1. The device 1 transmits a plurality of request messages to the proxy server 9 for Web pages, wherein each of the messages indicates browsing-related state data (step 53). At step 54 a heuristic algorithm is implemented within the proxy server 9 to detect and learn patterns of request messages. The proxy server 9 then pre-fetches at least HyperText content of Web pages that the proxy server 9 has learned will likely be requested (step 55). The pre-fetched HyperText content is then embedded in response codes within response messages transmitted to the mobile device 1 (step 56). The process ends at step 57.

As indicated above, the protocol of the preferred embodiment is preferably carried over a proprietary IPPP transport layer, but can also be easily adapted to run over TCP/IP on a specific port. The protocol is preferably implemented as a handler in the proxy server 9, thereby simplifying any currently existing protocol. (e.g. to avoid overloading a current HTTP protocol).

A person skilled in the art, having read this description of the preferred embodiment, may conceive of variations and alternative embodiments. For example, the conditional transfer of data based on communication of state information, as set forth above, may also be applied to separately transmitting individual portions of the multipart document as opposed to transmitting the entire document at once.

All such variations and alternative embodiments are believed to be within the ambit of the claims appended hereto.

The invention claimed is:

1. A method comprising:
   providing, via a server, a control channel between the server and a mobile device;
   receiving, at the server, over the control channel requests from the mobile device for content, the requests comprising data identifying previously requested content cached at the mobile device;
   implementing, at the server, a heuristic algorithm to build an internal statistical model of patterns of the requests to determine subsequent content that the mobile device is most likely to request;
   pre-fetching, at the server, a text portion of the subsequent content when the statistical model indicates that probability of requesting the subsequent content exceeds a first threshold;
   fetching a remaining portion of the subsequent content when the statistical model indicates that the probability of requesting the subsequent content exceeds a second threshold greater than the first threshold, and otherwise awaiting another one of the requests comprising a content identifier and adjusting the statistical model in response thereto; and
   embedding at least the portion of the subsequent content in responses transmitted over the control channel from the server to the mobile device browser.

2. The method of claim 1, further comprising modifying downloading of the content from the server to the mobile device based on tracking history of changes reflected in hash values of the data identifying the previously requested content cached at the mobile device.

3. The method of claim 1, further comprising inlining subsequent content data after sending current content to the mobile device.

4. The method of claim 3, wherein the subsequent content data is inlined within the current content.

5. The method of claim 4, wherein the statistical model includes time information for predicting that subsequent content will likely be requested within a specific time after the server begins sending current content to the mobile device.

6. The method of claim 1, further comprising building different statistical models for each of a plurality of mobile devices serviced by the server.

7. The method of claim 1, further comprising building global statistical model for a plurality of mobile devices serviced by the server.

8. The method of claim 1, wherein the statistical model comprises a selective blend between a single statistical model built for the mobile device and a global statistical model built for a plurality of mobile devices serviced by the server, selected on a content-identifier-sequence-by-content-identifier-sequence basis.

9. The method of claim 1, wherein the heuristic algorithm is selected from a group consisting of Hidden Markov Model algorithms, Bayesian inference methods and Neural Networks.

10. A communication system comprising:
a mobile device enabled to transmit over a control channel a plurality of requests, comprising data identifying previously requested content cached at the mobile device; and
a server enabled to:
implement a heuristic algorithm to build an internal statistical model of patterns of the requests to determine subsequent content that the mobile device is most likely to request;
when the statistical model indicates that probability of requesting the subsequent content exceeds a first threshold pre-fetch a text portion of the subsequent content;
when the statistical model indicates that the probability of requesting the subsequent content exceeds a second threshold greater than the first threshold, fetch a remaining portion of the subsequent content, and otherwise:
await another one of the requests comprising a content identifier; and
adjust the statistical model in response thereto; and
embed at least the portion of the subsequent content in responses transmitted over the control channel from the server to the mobile device browser.

11. The communication system of claim 10, wherein the server is further enabled to modify downloading of the content from the server to the mobile device based on tracking history of changes reflected in hash values of the data identifying the previously requested content cached at the mobile device.

12. The communication system of claim 10, wherein the server is further enabled to inline subsequent content data after sending current content to the mobile device.

13. The communication system of claim 12, wherein the subsequent content data is inlined within the current content.

14. The communication system of claim 13, wherein the statistical model includes time information for predicting that subsequent content will likely be requested within a specific time after the server begins sending current content to the mobile device.

15. The communication system of claim 10, wherein the server is further enabled to build different statistical models for each of a plurality of mobile devices serviced by the server.

16. The communication system of claim 10, wherein the server is further enabled to build a global statistical model for a plurality of mobile devices serviced by the server.

17. The communication system of claim 10, wherein the statistical model comprises a selective blend between a single statistical model built for the mobile device and a global statistical model built for a plurality of mobile devices serviced by the server, selected on a content-identifier-sequence-by-content-identifier-sequence basis.

18. The communication system of claim 10, wherein the heuristic algorithm is selected from a group consisting of Hidden Markov Model algorithms, Bayesian inference methods and Neural Networks.

* * * * *